(12) United States Patent
Caldwell et al.

(10) Patent No.: US 10,747,559 B2
(45) Date of Patent: Aug. 18, 2020

(54) AUTOMATED TROUBLESHOOT AND DIAGNOSTICS TOOL

(71) Applicant: T-Mobile USA, Inc., Bellevue, WA (US)

(72) Inventors: Jennifer Caldwell, Albuquerque, NM (US); Jie Hui, Mercer Island, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 35 days.

(21) Appl. No.: 15/676,955

(22) Filed: Aug. 14, 2017

(65) Prior Publication Data

US 2019/0050239 A1    Feb. 14, 2019

(51) Int. Cl.
| | |
|---|---|
| *G06F 17/00* | (2019.01) |
| *G06F 9/451* | (2018.01) |
| *G06F 11/07* | (2006.01) |
| *G06Q 30/00* | (2012.01) |

(52) U.S. Cl.
CPC ............ *G06F 9/453* (2018.02); *G06F 11/079* (2013.01); *G06Q 30/016* (2013.01)

(58) Field of Classification Search
None
See application file for complete search history.

(56) References Cited

U.S. PATENT DOCUMENTS

| | | | | |
|---|---|---|---|---|
| 7,269,784 B1* | 9/2007 | Kasriel | ............. | G06F 17/30902 707/E17.12 |
| 8,413,882 B1* | 4/2013 | Nidamarthi | ............. | G06Q 30/00 235/375 |
| 8,746,548 B2* | 6/2014 | Terwilliger | ............. | H04L 67/36 235/375 |
| 8,812,651 B1* | 8/2014 | Eriksen | ................. | H04L 45/745 709/224 |
| 10,134,050 B1* | 11/2018 | Hung | ................. | G06Q 30/0203 |
| 2003/0187672 A1* | 10/2003 | Gibson | ............... | G06Q 30/016 709/206 |
| 2005/0071754 A1* | 3/2005 | Morgan | ............ | G06F 17/30864 715/273 |
| 2006/0086796 A1* | 4/2006 | Onogi | ................ | G06K 7/10712 235/454 |
| 2007/0130511 A1* | 6/2007 | Roberge | ................... | G06N 5/02 715/204 |
| 2007/0150084 A1* | 6/2007 | Grubb | .................... | G06Q 10/00 700/110 |
| 2007/0250601 A1* | 10/2007 | Amlekar | ........... | G06F 17/30902 709/219 |
| 2009/0108057 A1* | 4/2009 | Mu | ................... | H04M 1/72561 235/375 |
| 2010/0077095 A1* | 3/2010 | Wong | .................... | G06Q 30/02 709/231 |

(Continued)

*Primary Examiner* — Mustafa A Amin
(74) *Attorney, Agent, or Firm* — Han Santos, PLLC (57) ABSTRACT

This disclosure describes a support user interface for a customer support application that allows a customer support representative to categorize and subcategorize a customer service issue in order to populate a set of probing questions, wherein selected answers to the probing questions can filter from multiple potential root causes, the most likely root cause of the customer service issue. Upon identifying the potential root cause to the customer service issue, one or more potential solutions can be implemented to resolve the customer service issue.

13 Claims, 5 Drawing Sheets

(56) References Cited

U.S. PATENT DOCUMENTS

| | | | |
|---|---|---|---|
| 2010/0261502 A1* | 10/2010 | Martin-Cocher ... | G06F 17/3043 455/556.1 |
| 2011/0085732 A1* | 4/2011 | Cheng ................. | G06K 7/14 382/182 |
| 2012/0131416 A1* | 5/2012 | Dugan ................. | G06F 11/32 714/760 |
| 2013/0036367 A1* | 2/2013 | DeRoos ............... | G06F 9/451 715/745 |
| 2018/0033017 A1* | 2/2018 | Gopalakrishnan Iyer | G06Q 30/016 |
| 2018/0268456 A1* | 9/2018 | Kumar ................. | G06F 16/3329 |

* cited by examiner

AUTOMATED TROUBLESHOOT AND DIAGNOSTICS TOOL

BACKGROUND

In a customer support and service environment, a multitude of customer support calls relating to a wide range of service issues may be addressed at any given time. With such wide range of service issues that need to be addressed, a customer support representative must be able to address each of the support calls. When a customer calls or chats with a customer care department of a wireless telecommunication carrier regarding a service issue, a customer support representative may work with the customer to resolve the issue. Even for what may be seemingly straightforward solutions, the support representative needs to spend time with the customer to correctly identify the problem. Thus, the first step in successful resolution is to ask probing questions to quickly guide the customer support representative in the right direction to obtain a resolution.

However, in some instances, a customer support representative may lack the expertise and the experience to ask the right probing questions to the customer. Accordingly, the customer support representative may require additional training or supervision to help effectively identify the service issue. In other instances, a customer support representative may prefer increasing the efficiency of providing customer service by automating the process of identifying the service issue by knowing the exact set of questions to ask the customer.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

DETAILED DESCRIPTION

This disclosure is directed to techniques for using an automatic troubleshooting and diagnostics tool to identify potential solutions to service issues and achieve a one-call resolution. In some embodiments, the troubleshooting and diagnostics tool includes a support user interface for displaying and selecting a category that is related a service issue (e.g., an account issue, a retail issue, a device issue, a network issue, a web issue, and/or so forth), and populating a set of probing questions associated with the selected category for narrowing down a root cause of the service issue and identifying a potential solution.

In some embodiments, the troubleshooting and diagnostics tool is configured to identify whether the service issue has been correctly categorized based on a customer's answers to probing questions. If the troubleshooting and diagnostics tool determines that the service issue was not correctly categorized, recommendations for selecting another category is provided to allow the tool to retrieve a new set of probing questions before implementing any potential solutions. This re-categorizing of service issues replaces the traditional "start over" paradigm for providing customer care, in which a customer support representative is required to start the support process from the beginning after failed attempts to implement potential solutions or incorrectly identifying a root cause of the service issue.

In various embodiments, one or more categories related to various service issues can comprise subcategories that can be selected via the support user interface for retrieving a more detailed set of probing questions to more accurately determine possible root causes to the service issues and identify potential solutions.

Additionally, the troubleshooting and diagnostics tool can use machine learning-based algorithms to automatically filter and select subsequent probing questions for display based on a customer's answers to preceding probing questions. In this way, the machine learning-based algorithms can ensure that the troubleshooting and diagnostics tool is populating and displaying only the most relevant probing questions while reducing the overall number of unnecessary or irrelevant questions to increase the efficiency of the initial investigation process or the information gathering process.

In some embodiments, the troubleshooting and diagnostics tool can use machine learning-based algorithms to reorder the presentation of probing questions on the support user interface or remove or add new probing questions based on a customer's answers to preceding probing questions.

In some embodiments, the troubleshooting and diagnostics tool can analyze a performance metric to accumulate knowledge regarding the effectiveness of the probing questions, such that the troubleshooting and diagnostics tool is able to filter probing questions that are most likely to correctly identify a possible root cause and potential solutions for solving service issues.

Accordingly, the use of the troubleshooting and diagnostics tool may increase the likelihood to achieve a one-call resolution for a customer who is experiencing a service issue. Further, the re-categorization of service issues at the onset of a support session increases the accuracy of identifying potential root cause while preventing a customer support representative from implementing potential solutions that are not suitable for the service issue. Therefore, the troubleshooting and diagnostics tool prevents taking time and availability away from customer support representatives to deal with other service issues. The techniques described herein may be implemented in a number of ways. Example implementations are provided below with reference to the following figures.

Example Architecture

Figure 1:
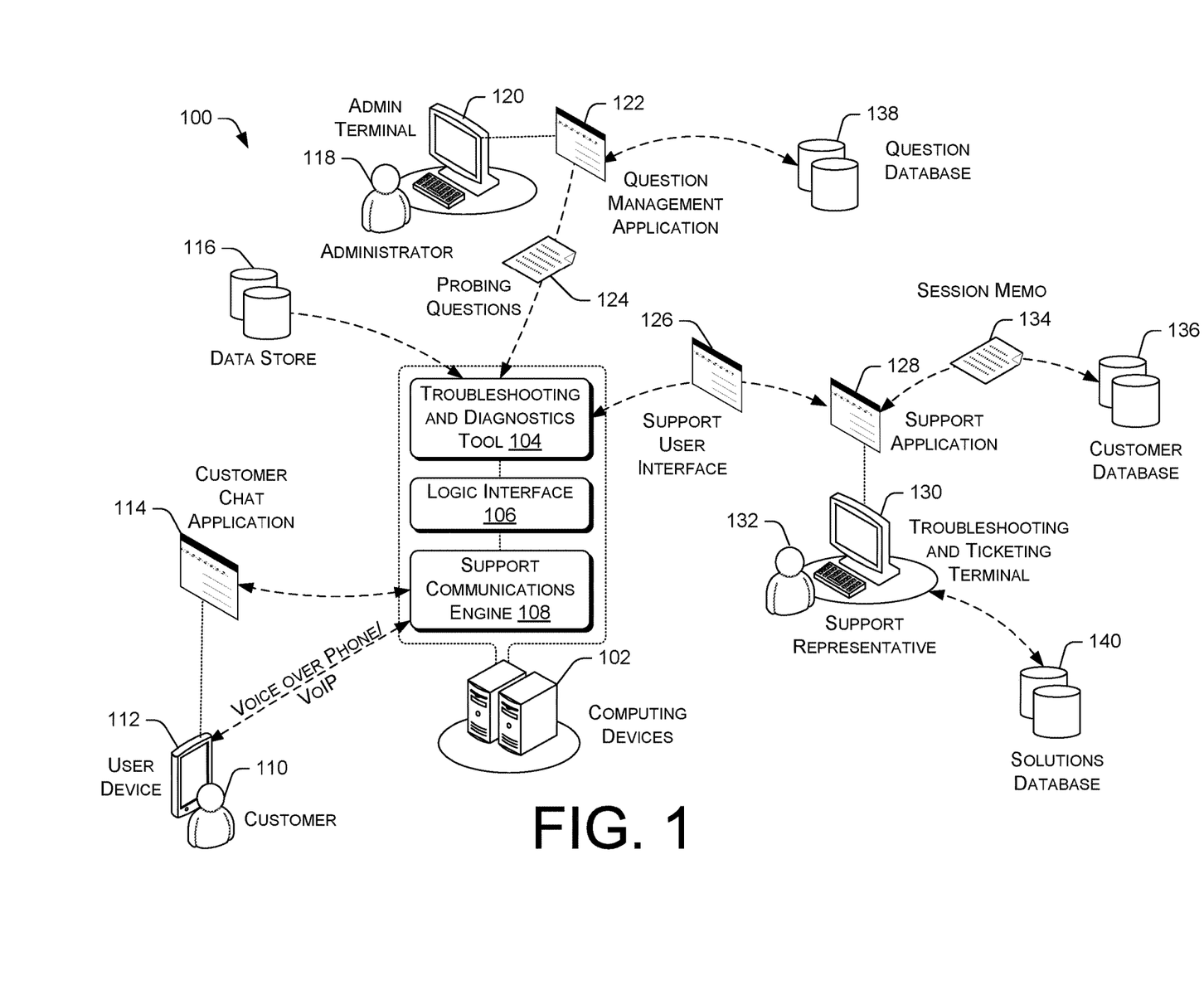
FIG. 1 illustrates example architecture for deploying an automated troubleshooting and diagnostics tool via a support user interface to ask probing questions to customers with service issues.

FIG. 1 illustrates example architecture for deploying an automated troubleshooting and diagnostics tool via a support user interface to ask probing questions to customers with service issues. The architecture 100 may include a wireless telecommunication network having a user device 112 that is operated by a customer 110. In various embodiments, the user devices may include mobile handsets, smart phones, tablet computers, personal digital assistants (PDAs), smart watches, and/or electronic devices.

The customer 110 can communicate with a customer support representative 132 of a wireless telecommunication carrier via a customer chat application 114 on the user device 112. In various embodiments, each customer support representative that is in a support session may be an internal or an external customer support representative of the wireless telecommunication network. An internal customer support representative may be an employee or contractor that works directly for the wireless telecommunication carrier that operates the wireless telecommunication network. An external customer support representative may be a third-party vendor, a third-party contractor, a crowd-sourced expert, and/or so forth that do not work directly for the wireless telecommunication carrier. Each customer support representative may be located at one of multiple locations. The locations may include a call center of the wireless telecommunication carrier, a physical retail store that is operated by the wireless telecommunication carrier, a remote third-party location, and/or so forth.

The customer chat application 114 may be a standalone application or a part of a customer support application 128 that is provided to the customer 110 by the wireless telecommunication carrier. The customer chat application 114 may be implemented using various protocols, such as the Session Initiation Protocol (SIP), SIP Instant Messaging and Presence Leveraging Extensions (SIMPLE), Application Exchange (APEX), Instant Messaging and Presence Protocol (IMPP), Extensible Messaging and Presence Protocol (XMPP), or other messaging protocols.

The customer chat application 114 initiates a support chat session with a support communications engine 108. In such a scenario, the support communications engine 108 may prompt the customer 110 to provide a service issue in the form of a text message that describes the wireless telecommunication service problem encountered by the customer 110.

In some embodiments, the customer 110 can chat with a customer support representative 132 at a troubleshooting and ticketing terminal 130, with a chatbot that is configured to engage in a conversation with the customer 110, or a combination thereof. In this regard, a chatbot can comprise a conversation engine for engaging in a conversation with the customer 110 by natural language processing—that is, translating a customer request (e.g., a customer's question) and processing the request to generate an appropriate response in accordance with the request. It is contemplated that various types of machine learning algorithms/deep learning algorithms through supervised and unsupervised learning can also be applied to learn new patterns of customers' requests and responses that can be understood by both humans (i.e., customers) and machines over time.

The customer 110 can also communicate with the customer support representative 132 via a voice over phone service or voice over Internet Protocol (i.e., telephone calls) by placing a telephone support call to a customer care phone number of the wireless telecommunication network, wherein the support communications engine 108 can intercept the call. In some embodiments, the support communications engine 108 may prompt the customer 110 to leave a message in the form of an audio recording that describes a wireless telecommunication service issue encountered by the customer 110. The customer's message can then be stored in a queue to allow a customer support representative 132 to call back the customer 110 at a later time.

Accordingly, the chat application 114 and/or voice over phone service/VoIP can route the customer 110 to the customer support representative 132 at the troubleshooting and ticketing terminal 130 via the support communications engine 108. The telephone calls and the online chat session messages over the customer chat application 114 may be routed to the support communications engine 108 via various customer communication routing function and protocols of the wireless telecommunication network.

The architecture 100 may further include a troubleshooting and diagnostics tool 104 and a logic interface 106 for the support application 128. The support communications engine 108, the troubleshooting and diagnostics tool 104, and the logic interface 106 for the support application 128 may execute on one or more computing devices 102 in the network. The one or more computing devices 102 may include general-purpose computers, such as desktop computers, tablet computers, laptop computers, servers, or other electronic devices that are capable of receive inputs, process the inputs, and generate output data. In still other embodiments, the one or more computing devices 102 may be virtual computing devices in the form of computing nodes, such as virtual machines and software containers. In various embodiments, a wireless telecommunication carrier that provides the wireless telecommunication network, and/or a third-party entity that is working with the mobile telecommunication carrier may control the computing devices 102.

The support communications engine 108 may route incoming telephone calls or online chat session messages with service issues to one or more customer support representatives 132 of the wireless telecommunication carrier. The service issues identify specific problems that a customer is experiencing such as technical issues, and the service issues can be delivered in the form of a report, a message, or any combination thereof. In some embodiments, the support communications engine 108 can route incoming calls or chat session messages with service issues to customer support representatives 132 in a specific department that is most suited to resolve the service issue. Alternatively, the support communications engine 108 can route incoming calls or chat session messages with service issues based on a customer support representative's current status, which may indicate whether the representative is available to provide support service, is busy providing service to another customer or is unavailable to provide support service.

Preferably, the service issue originates from customers 110. In some embodiments, the customer support representative 132, during or after a support session, may make detail edits to the service issue of the customer by adding notes or memos in a report or message associated with the service issue based on the obtained knowledge and/or experience of the customer support representative 132. For example, the customer support representative 132 may note that the service issue is actually a malfunction of a software component of the user device 112 rather than a malfunction of a hardware component of the user device 112. In another example, the customer support representative 132 may note that the service issue is actually with a network cell rather than the user device 112. The support application 128 at the troubleshooting and ticketing terminal 130 may generate a session memo 134 that includes the details of the service issues and/or the detail edits by the customer support representative 132.

In various embodiments, the support application 128 may be a chat program, a customer support wizard, and/or a customer service and technical service program that resides on the troubleshooting and ticketing terminal 130 of the customer support representative 132. The support application 128 can be its own standalone application or a part of another customer support system. In some instances, the customer support representative 132 may further use the support application 128 to request data for resolving various service issues, contextual data, or other data relevant to the customer 110, the user device 112 of the customer 110, or components of the wireless telecommunication network that are relevant to service issue experienced by the customer 110 from various data sources.

The troubleshooting and diagnostics tool 104 is in communication with a question management application 122 that can be executed at an admin console or admin terminal 120 for receiving probing questions 124 to identify the most likely root cause for the customer's service issue. An administrator 118 at the admin terminal 120 can enter new probing questions, remove probing questions, update probing questions, or otherwise manage probing questions via the question management application 122. The probing questions 124 can be stored in a question database 138 that is communicably coupled to the admin terminal 120.

The question management application 122 is further configured to generate one or more smart checklists, each smart checklist comprising a set of probing questions. The probing questions 124 can be organized so that they can be categorized according to a type of service issue. In some embodiments, the probing questions 124 can be labeled or tagged with a keyword so that each probing question 124 is associated or correlated with a category. For example, some probing questions can be labeled as a question that relates to a software problem category. In this way, the question management application 122 can generate a smart checklist that includes a set of probing questions related to a software problem.

In some embodiments, one probing question can be labeled or tagged with multiple keywords so that the probing question can be associated or correlated with more than one category. For example, some probing questions can be labeled as a question that relates to a software problem category and a messaging problem category. In this way, the question management application 122 can generate a first smart checklist that includes a first set of probing questions related to a software problem and a second smart checklist that includes a second set of probing questions related to a messaging problem, wherein both the first smart checklist and the second checklist contains one or more overlapping probing questions.

Each of the probing questions 124 preferably comprises a "yes" or "no" question so as to allow a customer support representative to input or select (e.g., via a button that can be activated on a graphical user interface) a customer's answers to the probing questions in a convenient, succinct, and expedited manner during a support session. Additionally, providing "yes" or "no" probing questions allows the troubleshooting and diagnostics tool 104 to direct the customer support representatives to correct or appropriate subsequent probing questions and/or to determine a possible root cause for the service issue to implement a potential solution.

In some embodiments, the probing questions 124 can comprise multiple-choice questions, true or false questions, short answer questions, long answer questions, matching questions, fill-in-the-blank questions, option selection questions, and/or any combination thereof. In this regard, the troubleshooting and diagnostics tool 104 can analyze the answers in order to direct the customer support representatives to correct or appropriate subsequent probing questions and/or to determine a possible root cause for the service issue to implement a potential solution.

The troubleshooting and diagnostics tool 104 may use machine learning algorithms to analyze the answers provided by the customer to the probing questions 124 to more accurately determine the service issue encountered by the customer. More specifically, the troubleshooting and diagnostics tool 104 can identify the probable root cause for the service issue based on the answers provided by the customer to the probing questions 124. For instance, a customer 110 can specify that the service issue relates to a mobile application crashing repeatedly on his or her user device 112, and based on the customer's answers to the probing questions, the troubleshooting and diagnostics tool 104 can determine that the root cause for the mobile application crashing is a hardware problem.

The troubleshooting and diagnostics tool 104 may also use machine learning algorithms to analyze the answers provided by the customer to the probing questions 124 to determine if the correct probing questions 124 have been asked to the customer or if the service issue has been correctly categorized to retrieve the correct smart checklist of probing questions. For example, if a customer answers mostly "no" to a set of probing questions 124, the troubleshooting and diagnostics tool 104 can determine that the probing questions 124 are not relevant to the customer's service issue. Once the troubleshooting and diagnostics tool 104 determines that incorrect probing questions have been asked to the customer or that the service issue has been miscategorized, the troubleshooting and diagnostics tool 104 can suggest or recommend a new category for selection to retrieve a new smart checklist or a new set of probing questions related to the new category from the question database 138.

In various embodiments, the machine learning algorithms can match or correlate specific words or phrases in various smart checklists and/or probing questions within the question database 138 to specific words or phrases included in the service issue to correctly categorize the service issue. In some embodiments, the machine-learning algorithms may also use a customer's answers to a set of probing questions as well as customer-related information to obtain contextual information related to the service issue to determine whether the service issue is correctly categorized.

Without limitation, the contextual information may include relevant network information, device information, and/or customer account information. The network information may include information regarding the technical and operational status of the wireless telecommunication network. For example, network information of the network may indicate that Long-Term Evolution (LTE) spectrum coverage (or other spectrum coverage) is unavailable in a particular geographical area or that a network node was temporarily overwhelmed with network traffic at a particular time due to a major event. The device information of user devices may indicate the technical capabilities, feature settings, and operational statuses of user devices. For example, device information for the user device 112 may indicate that Wi-Fi calling is enabled on the user device or that the user device is capable of using a specific communication band provided by the wireless telecommunication network. In other examples, the device information for the user device 112 may indicate that Wi-Fi calling is disabled on the user device, a developer mode is active on the user device, a location tracking service is active on the user device, and/or so forth. The customer account information for a customer may include account details of multiple users, such as account type, billing preferences, service plan subscription, payment history, data consumed, minutes of talk time used, and/or so forth. For example, the account data of the customer 110 may indicate that the user has a postpaid account and that the user is current with payments for the subscribed service plan.

The data associated with the contextual information as well as data related to probing questions, solutions for root cause, service issues, customers that provide the service issues, and other data can be stored and managed in a data store 116, wherein the data store 116 can be communicably coupled to the troubleshooting and diagnostics tool 104. The data store 116 may include various databases including a question database 138, a solutions database 140, and a customer database 136. In various embodiments, the data store 116 can comprise other data sources for storing and managing data related to network-related information, device-related information, regulatory information for networks and devices, device manufacturer information, credit information on users, and/or so forth.

The customer database 136 comprises customer-related information, including the customer account information as described above. Additionally, the customer-related information can comprise information relating to past and present customer support sessions, which include session memos 134. The session memos 134 include service issues addressed during each customer support session, notes or memos generated during each customer support session, the transcript of the session the customer support representative 132 had with the customer 110, probing questions asked to the customer, possible root causes determined for the service issues, potential solutions implemented to resolve the service issues, including any tests and procedures performed, outcomes of the solutions implemented, problem resolution history, and/or so forth. In some embodiments, session memo 134 may include transcript and/or information from multiple individual support sessions, as well as subsequent notes or memos input by multiple customer support representatives and/or others. The session memo 134 may further include contextual information and data from external sources. The session memos 134 can be generated via the support application 128 at the troubleshooting and ticketing terminal 130.

Following the presentation of probing questions 124 and answering the probing questions via the support user interface 126, the answers to the probing questions may be further process by the troubleshooting and diagnostics tool 104 to surface potential solutions to the service issue. In various embodiments, the troubleshooting and diagnostics tool 104 may use a machine-learning algorithm to determine a root cause of the service issue. Upon determining the root cause, the troubleshooting and diagnostics tool 104 may generate a solution that remedies the root cause from information stored in the solutions database 140. The solutions database 140 is in communication with the troubleshooting and ticketing terminal 130 and can include code segments, fixes developed and provided by a technician, descriptions or a logical, step-by-step solution sequence, and/or so forth. If there is more than one potential solution for resolving a service issue, the solutions can be ordered according to the probability that they will successfully resolve the problem.

The root cause and the potential solutions may be presented to the customer support representative 132 at the support user interface 126. In turn, the customer support representative 132 may present the solution to the customer 110 in the support session, wherein the solution can be displayed on the user device 112. Following the implementation of a potential solution to resolve the service issue, the troubleshooting and diagnostics tool 104 determines whether the service issue is resolved. If the service issue is not resolved, the troubleshooting and diagnostics tool 104 can implement a second potential solution and so on until the service issue is resolved. In some instances, the solution may successfully remedy the service issue and the support session may be terminated. Following the end of the support session, the support application 128 may forward the session memo 134 to the customer database 136. In this way, the session memo 134 can be accessed at a later time if the customer contacts a customer support representative 132 in the future with a similar service issue.

Example Computing Device Components

Figure 2:
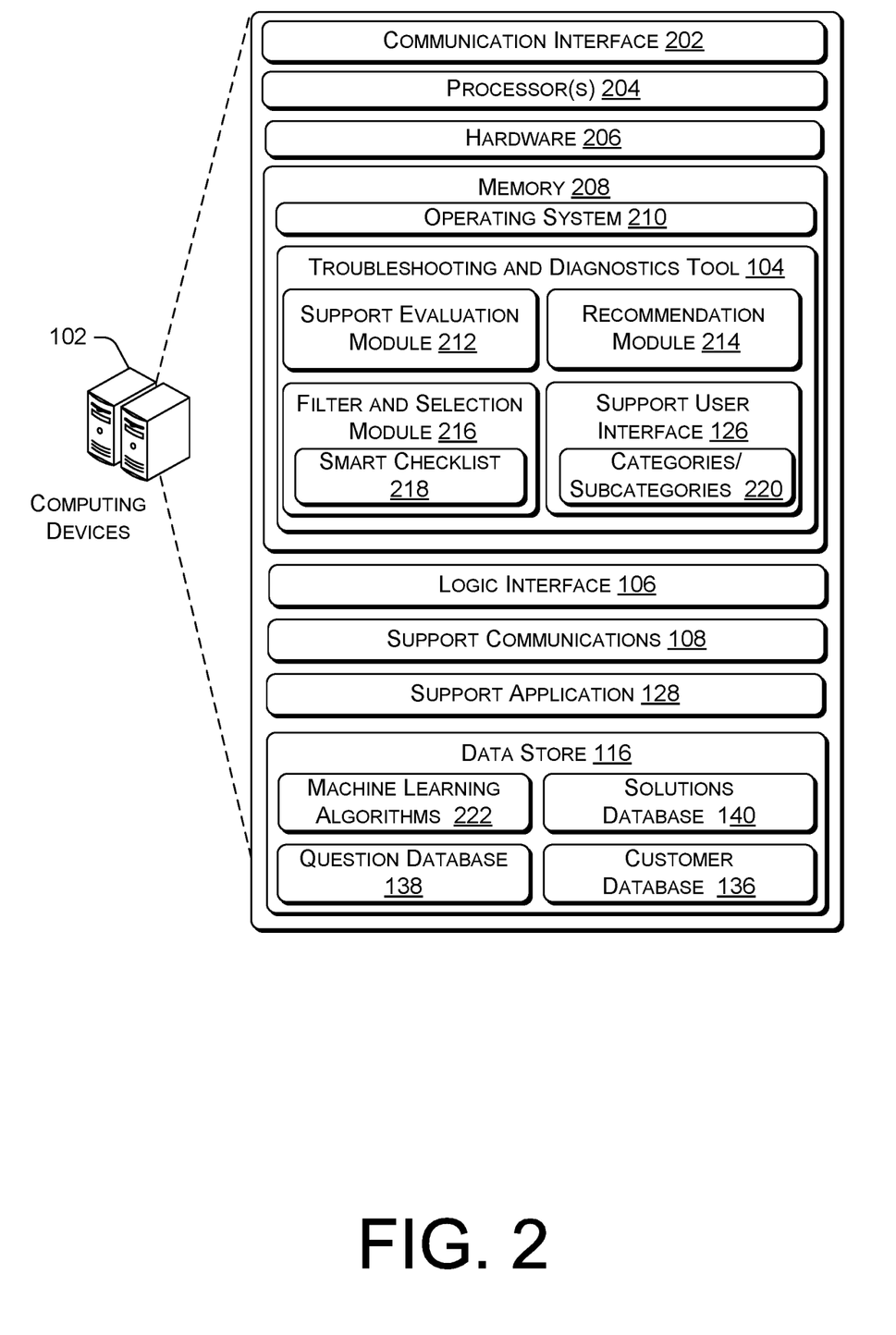
FIG. 2 is a block diagram showing various components of one or more illustrative computing devices that implement a troubleshooting and diagnostics tool that probes customers with service issues to identify a potential solution.

FIG. 2 is a block diagram showing various components of one or more illustrative computing devices that implement a troubleshooting and diagnostics tool that probes customers with service issues to identify a potential solution. The computing devices 102 may include a communication interface 202, one or more processors 204, hardware 206, and a memory unit 208. The communication interface 202 may include wireless and/or wired communication components that enable the devices to transmit data to and receive data from other networked devices. The hardware 206 may include additional hardware interface, data communication, or data storage hardware. For example, the hardware interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The memory unit 208 may be implemented using computer-readable media, such as computer storage media. Computer-readable media includes, at least, two types of computer-readable media, namely computer storage media and communications media. Computer storage media includes volatile and non-volatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or another transmission mechanism.

The processors 204 and the memory unit 208 of the computing devices 102 may implement an operating system 210. In turn, the operating system 210 may provide an execution environment for the troubleshooting and diagnostics tool 104, logic interface 106, support communications engine 108, support application 128, and data store 116. The operating system 210 may include components that enable the computing devices 102 to receive and transmit data via various interfaces (e.g., user controls, communication interface, and/or memory input/output devices), as well as process data using the processors 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The troubleshooting and diagnostics tool 104 may include a support evaluation module 212, a recommendation module 214, a filter and selection module 216, and support user interface 126. The modules may include routines, program instructions, objects, code segments, and/or data structures that perform particular tasks or implement particular abstract data types.

The support user interface 126 is configured to provide a graphical user interface (GUI) that can display one or more categories 220 related to various service issues. The categories 220 can be displayed as icons that can be activated upon selection by an end user, for example, a customer support representative. In some embodiments, the categories further comprise subcategories such that when one category is selected, the subcategories that fall under the selected category are displayed. The subcategories can also be displayed as icons that can be activated upon selection by the customer support representative. The categories and the subcategories 220 can be added, removed, or otherwise managed by an administrator at the admin terminal via the question management application.

Each of the categories and/or the subcategories correlates to various service issues that can be encountered by a customer. Without limitation, the categories can include data problem, signal and voice, software, messaging, hardware, and services and features. In various embodiments, the troubleshooting and diagnostics tool 104 may use machine learning algorithms to automatically categorize a service issue under a given list of categories and/or subcategories 220 presented on the support user interface 126. The categorization may be performed based on descriptive words and/or phrases used by the customer in the service issue and/or the relevant contextual information provided by the customer or other data sources.

Upon selection of a category and/or subcategory, the filter and selection module 216 retrieves, from the questions database, a smart checklist 218 that corresponds to the selected category and/or subcategory. The smart checklist 218 comprises a set of probing questions that are derived from the questions database, wherein the probing questions in the questions database are also managed by the administrator via the question management application. The retrieved set of probing questions is displayed on the support user interface 126.

In various embodiments, the filter and selection module 216 may filter subsequent probing questions based on a customer's answers to preceding probing questions. In this regard, the filter and selection module 216 may provide multiple filter probing questions following one probing question in order to direct the customer support representative to ask the correct subsequent questions to the customer. Alternatively, the filter and selection module 216 may eliminate subsequent probing questions following one probing question or skip a probing question. For example, if a customer answers "no" to one probing question, the customer need not answer the following question that inquires, "if answered 'yes' to the preceding question . . . " In some embodiments, the filter and selection module 216 may also display probing questions in a random order or in a round robin fashion.

Additionally, the filter and selection module 216 is configured to identify a possible root cause of the service issue based on the customer's answers to the probing questions. More specifically, the binary nature of the "yes" or "no" question format for the probing questions allow the filter and selection module 216 to make analysis in the shape of a decision tree, wherein each question provides two option, "yes" or "no," and each option having sub-branches with the same "yes" or "no," and so on until the process reaches its logical end, i.e., a root cause of a service issue. In operation, the filter and selection module 216 may use a machine-learning algorithm to determine a root cause for a service issue.

In various embodiments, the probing questions can also be formatted to allow the customer support representative to make "if" type of decisions or answers to account for variables. For example, a probing question can be formatted to inquire whether the customer experiences trouble connecting to Wi-Fi versus whether the customer experiences trouble connecting to Wi-Fi if the customer is trying to connect to a new network. In this regard, the customer could answer "no" to the former question but "yes" to the latter question. Accordingly, the smart checklist can comprise multiple seemingly similar probing questions in order to most accurately filter a possible root cause.

The support evaluation module 212 may monitor the smart checklist in order to ensure that the probing questions contained within the smart checklist can help correctly identify a root cause to a service issue and implement a potential solution based on the root cause. In this regard, the support evaluation module 212 may add or remove one or more probing questions based on the relevance or the importance of the questions in resolving service issues for customers. For example, if the filter and selection module 216 can correctly filter probing questions and/or correctly determine a possible root cause regardless of a customer's answer to a probing question, that probing question is not considered relevant and can be tagged for removal via the question management application. Alternatively, if the same probing question consistently appears in various sets of questions that do not correctly identify a root cause to a service issue, the question is considered to be misleading or incorrect and can be tagged for removal via the question management application.

In various embodiments, the support evaluation module 212 may request the question management application to reorder questions in order to present the most relevant probing question first. In this way, the probing questions can be ranked within each smart checklist or set of questions. For example, the probing questions can be manually ranked based on an administrator's input via the question management application. Alternatively, each of the probing questions can have weights assigned based on the importance of the question. In this way, the probing questions can be presented in order by weight (e.g., heaviest to lightest).

The support evaluation module 212 may determine whether a service issue is correctly categorized under a selected category or a selected subcategory. For example, the support evaluation module 212 may indicate that the service issue was incorrectly routed when, following a discussion with the customer, a customer support representative determines that the customer actually has a different service issue than initially indicated. In another instance, the support evaluation module 212 may provide an indication via the support user interface 126 an option to select another category or subcategory provided by the recommendation module 214.

Accordingly, if the support evaluation module 212 receives an indication that the service issue was not correctly categorized, the customer support representative can select a new category to receive a new smart checklist including a new set of probing questions instead of continuing and potentially identifying an incorrect root cause to the service issue for the troubleshooting. The session memo may contain details of incorrectly categorizing a service issue to prevent similar details in a future customer support session to lead to miscategorization of a similar service issue.

The support evaluation module 212 may further generate evaluation data that summarizes the issue resolution performance of a customer support session. The evaluation data may show the issue resolution rate, the average resolution time, the average customer wait time before action, the customer satisfaction rating, and/or other performance categories for the customer support representative. Accordingly, the support evaluation module 212 may make a recommendation as to whether to continue using the same smart checklist and set of probing questions based on the evaluation data.

Subsequently, the recommendation module 214 may find one or more matching potential solutions for the root cause from a solutions database based on the customer's answers to the probing questions. For example, if the root cause of a service issue is the lack of network coverage, the potential solution for the root cause may be the activation of Wi-Fi calling and/or the installation of a Wi-Fi calling capable router. In another example, if the root cause of the service issue is user device software that is incompatible with the wireless telecommunication network, the potential solution may be an upgrade to the software of the user device.

The recommendation module 214 can automatically generate a solution based on a protocol stored in the solutions database, wherein the protocol correlates to the root cause. The recommendation module 214 can also use a machine learning-based recommendation algorithm to generate potential solutions for service issues based on the customer's answers to the probing questions. A potential solution for a service issue may be presented to a customer support representative on the support user interface 126 and then delivered to a customer during a support session in the form of an online chat session or a telephone call. The machine learning-based recommendation algorithm may be a naïve Bayes algorithm, a Bayesian network algorithm, a decision tree algorithm, a neural network algorithm, a support vector machine, and/or so forth.

In one implementation, the machine learning-based recommendation algorithm may be a Bayesian inference graph that stores multiple potential symptoms of multiple root causes as child nodes, in which each symptom is assigned a probability of corresponding to an associated root cause. In some instances, a child node for a symptom may have one or more additional child nodes that store sub-symptoms, in which the sub-symptoms have their respective probabilities corresponding to the parent symptom. By traversing the probabilities in the inference graph, a machine-learning algorithm can receive a sub-symptom, find the likely parent symptom, and then proceed onto parent nodes until finding the likely root cause. Subsequently, the recommendation module 214 may parse out the service issue details and notes or memos from a session memo. The recommendation module 214 may modify one or more probabilities in the Bayesian inference graph based on information in the session memo.

Once the one or more probabilities in the Bayesian inference graph are modified, the recommendation module 214 may use a machine-learning algorithm to search for the indicia of the symptoms in the Bayesian inference graph based on the details in the service issue and the session memo. During the search, the Bayesian inference graph may be evaluated by the machine-learning algorithm to find a root cause to the service issue. The root cause and the one or more corresponding solutions may be provided by the recommendation module 214 to a customer support representative for viewing on the support user interface 126.

The memory unit 208 may also include a data store 116 that is used by the troubleshooting and diagnostics tool 104 and that can be accessed via an admin terminal and troubleshooting and ticketing terminal. The data store 116 includes one or more databases, including, without limitation, a solutions database 140, a question database 138, and a customer database 136. The data store 116 may also provide storage of the machine learning algorithms 222 that are used by the troubleshooting and diagnostics tool 104.

The solutions database 140 may provide solutions for root causes that are identified by the recommendation module 214. The solutions database 140 can be communicably coupled to a troubleshooting and ticketing terminal so as to deliver potential solutions for root causes to the support user interface via the support application that resides on the troubleshooting and ticketing terminal. In some embodiments, the solutions database 140 comprises protocols for generating and implementing solutions to resolve service issues and machine learning-based recommendation algorithm to generate potential solutions for service issues. Additionally, the solutions database 140 can be further in communication with external data sources to obtain other solutions-related information.

The question database 138 comprises smart checklists and probing questions that are generated via the question management application, wherein the question database 138 is in communication with the admin terminal for receiving and storing probing questions. Because the smart checklists and the probing questions are organized by categories and/or subcategories, the question database 138 also comprises data relating to the categories and/or subcategories. In some embodiments, the question database 138 is also configured to receive requests for retrieval of smart checklists and probing questions during a customer support session.

The customer database 136 comprises customer-related information and customer support session information. The customer account information can include account details of a customer and multiple users associated with the customer, including account type, billing preferences, service plan subscription, payment history, data consumed, minutes of talk time used, and/or so forth. The customer support session information includes session memos from each support sessions associated with the customer, wherein the session memos contain service issues from telephone calls or online chat session messages and voice recordings. In some embodiments, voice recordings from a customer support session can be transcribed via a speech-to-text module to generate a text of the voice recordings.

The session memo also includes notes, messages, and/or reports input by a customer support representative, wherein the memo can be generated by the support application 128. The notes, messages, and/or reports can be entered during or after communicating with the customer via a telephone call or an online chat session. The session memo may include additional details regarding the service problem as revealed by the customer, highlighting of particular problem aspects, corrections to certain details of the service issue, and/or so forth. For example, the session memo may recite factual data about a service problem, such as date and time the service problem first occurred, the location of the affected user device when the service problem occurred, the duration of the service problem, the symptoms experienced by the customer with respect to the service problem, attempted solutions for the service problem, and/or so forth. In some embodiments, the support application 128 may use encryption or security algorithms to ensure that the session memos are secured from unauthorized viewing. The session memo can be retrieved or recalled from the customer database 136 at a later time during another customer support session to allow a subsequent customer support representative to view the session memo.

Additional details regarding the functionalities of the troubleshooting and diagnostics tool 104 are discussed in the context of FIGS. 3-9. Thus, the troubleshooting and diagnostics tool 104 may include other modules and databases that perform the functionalities described in the context of these figures.

Example User Interface

Figure 3:
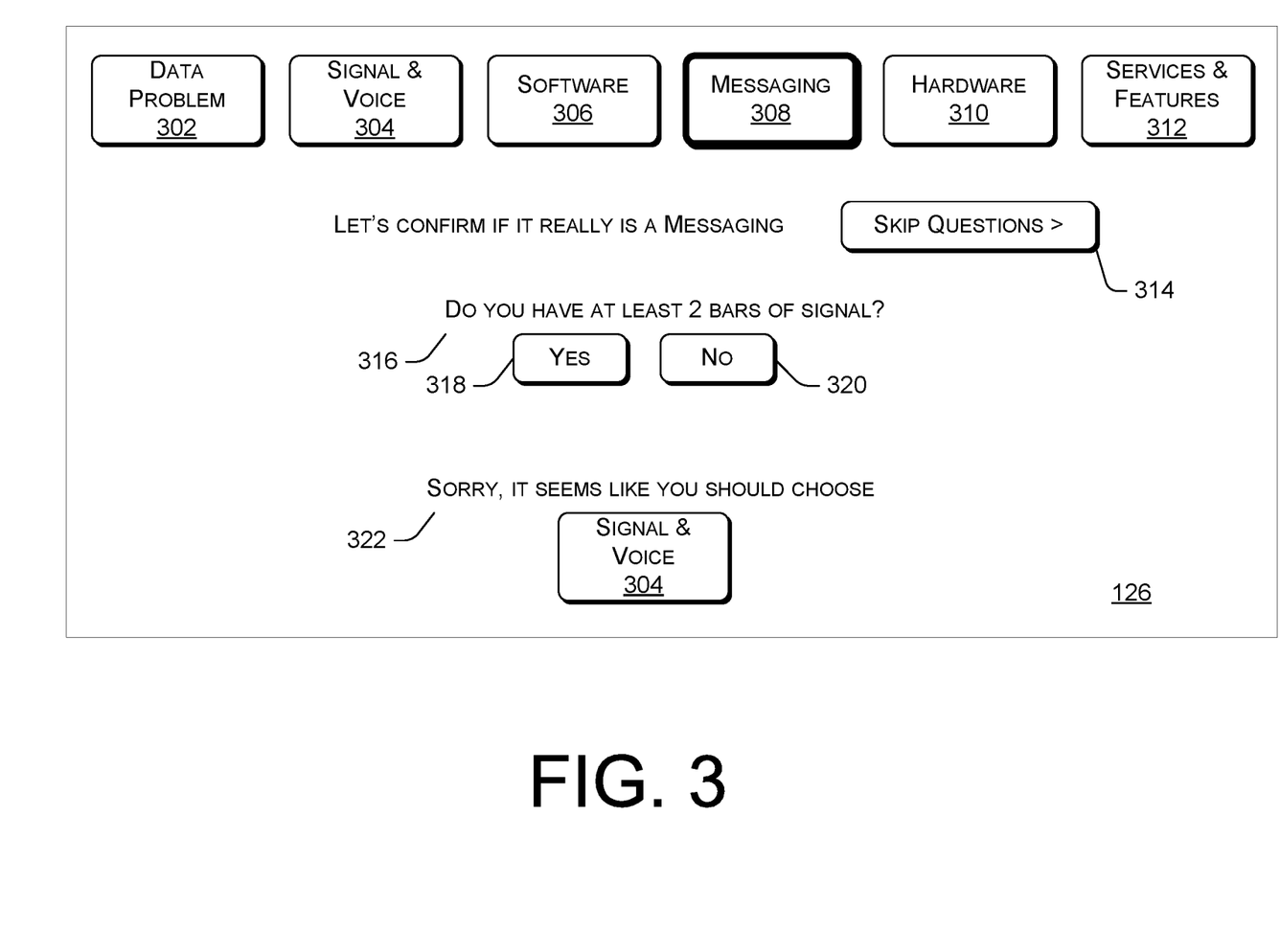
FIG. 3 is an exemplary support user interface for displaying probing questions to a customer support representative to determine a service issue.

FIG. 3 is an exemplary support user interface for displaying probing questions to a customer support representative during a customer support session to determine a service issue. The support user interface 126 is supported via a support application at a troubleshooting and ticketing terminal. The support user interface 126 includes a GUI having one or more categories that can be presented in a menu or a list, wherein the categories can comprise buttons or icons that can be activated upon being clicked. The categories relate to various service issues. In the exemplary embodiment, the categories include data problem 302, signal and voice 304, software 306, messaging 308, hardware 310, service and features 312. The customer support representative can select one of the categories by clicking via a mouse or tapping via a touchscreen on a user device.

Upon selection of a category (e.g., messaging 308 as depicted in FIG. 3), the support user interface 126 displays a set of probing questions 316 related to the selected category. In some embodiments, the support user interface 126 displays a button 314 that can be activated to skip answering the probing questions. If the customer support representative easily identifies the root cause of a service issue to implement a potential solution, the customer support representative can click or tap the button 314 in order to proceed to troubleshoot.

However, the customer support representative can proceed with diagnosing the service issue by proceeding with answering the probing questions 316 displayed on the support user interface 126 (i.e., not activate the skip questions button 314). In the illustrated embodiment, a series of "yes" or "no" probing questions are presented. In this regard, a "yes" button 318 and a "no" button 320 appear under each probing question 316. In some embodiments, the support user interface 126 is configured to display only one new question at a time such that subsequent probing questions can appear upon selection of a "yes" button 318 or a "no" button 320. In this regard, the filter and selection module of the troubleshooting and diagnostics tool can determine whether to display any follow-up probing questions based on the customer's answers to the preceding questions. Alternatively, all of the probing questions in a set can appear concurrently so as to allow the customer support representative to prepare which questions to ask next.

Once all of the probing questions are answered, the support evaluation module can determine if the service issue was incorrectly categorized based on the answers to the probing questions. If the support evaluation module determines that the service issue was incorrectly categorized, the support evaluation module can trigger the recommendation module to notify the user via a message 322 that the service issue was incorrectly categorized and to recommend a different category for the customer support representative to select. A newly recommended category can be presented on the support user interface 126 in a button or icon format that can be activated. Upon selection of a new category, the support user interface 126 can display a new set of probing questions.

In some embodiments, the troubleshooting and diagnostics tool may use the machine learning algorithms to automatically categorize a service issue that is experienced by the customer. In this regard, the troubleshooting and diagnostics tool can obtain relevant data from various data sources to categorize the service issue. For example, if the customer states that "my LTE is not working" in a chat session over the customer chat application or the customer indicates that the service issue relates to LTE not working, the machine-learning algorithm may determine that the service issue is categorized under signal and voice. In another example, if the customer states that he or she cannot "get on the Internet after receiving a software update" in during a telephone support call, the machine learning algorithm may determine that the service issue is categorized under software.

In some embodiments, the support user interface 126 further comprises a status tracking function to provide the customer support representative the ability to track where they are in the troubleshooting and diagnostics process. The status tracking function can comprise a graphical element for display on the support user interface 126 to provide a visual aid for the customer support representative during a support session. In various embodiments, the status tracking function can specify how many steps were accomplished out of the total number of steps in the support session. The graphical element can be textual (e.g., "3 out of 5 steps completed," "60% completed") or pictorial (e.g., a pie chart). Alternatively, the status tracking function can provide an estimated time of to resolving the service issue.

Example Processes

Figure 4:
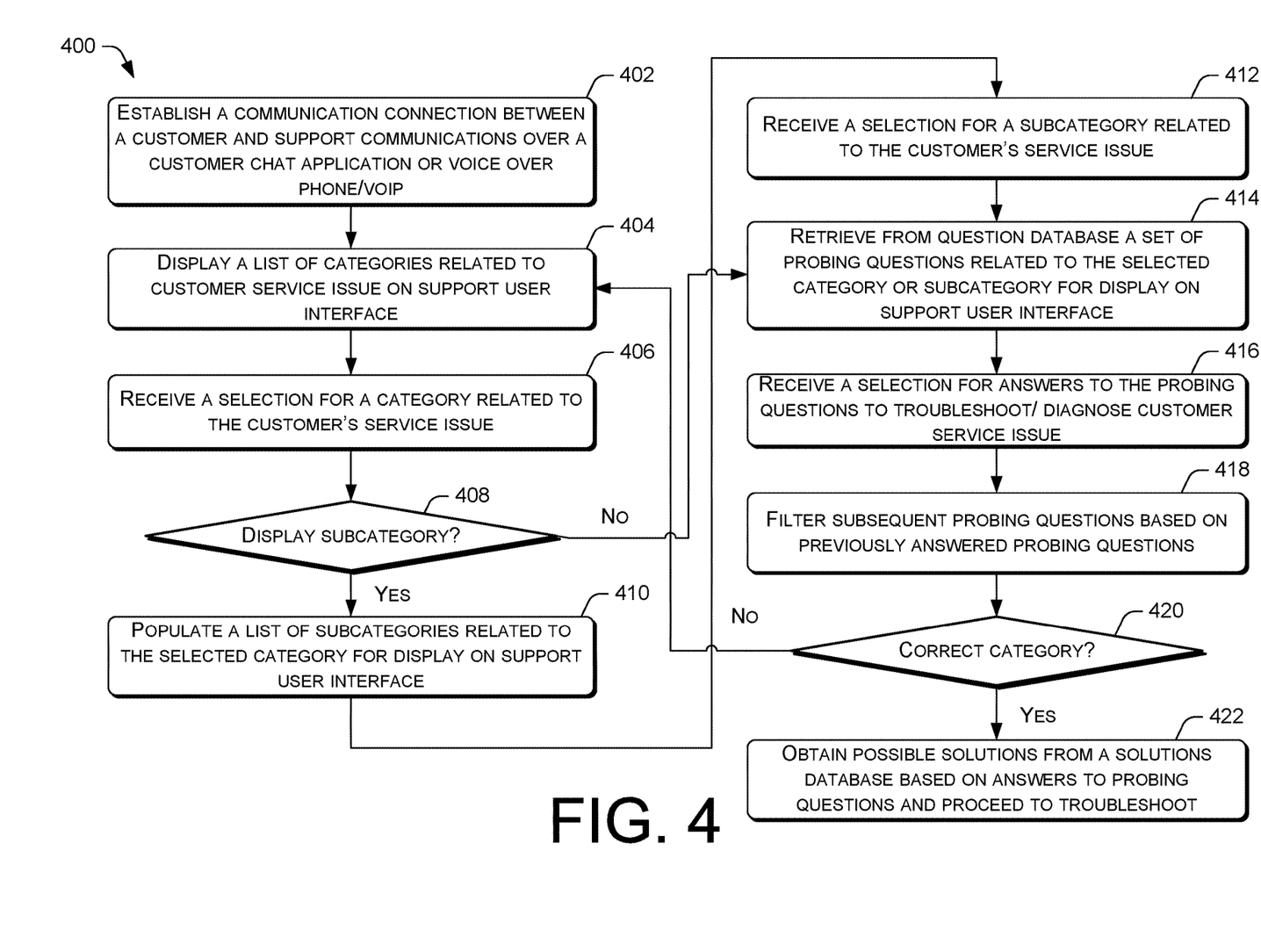
FIG. 4 is a flow diagram of an example process for using a troubleshooting and diagnostic tool to retrieve and display probing questions to a customer support representative via a support user interface.
Figure 5:
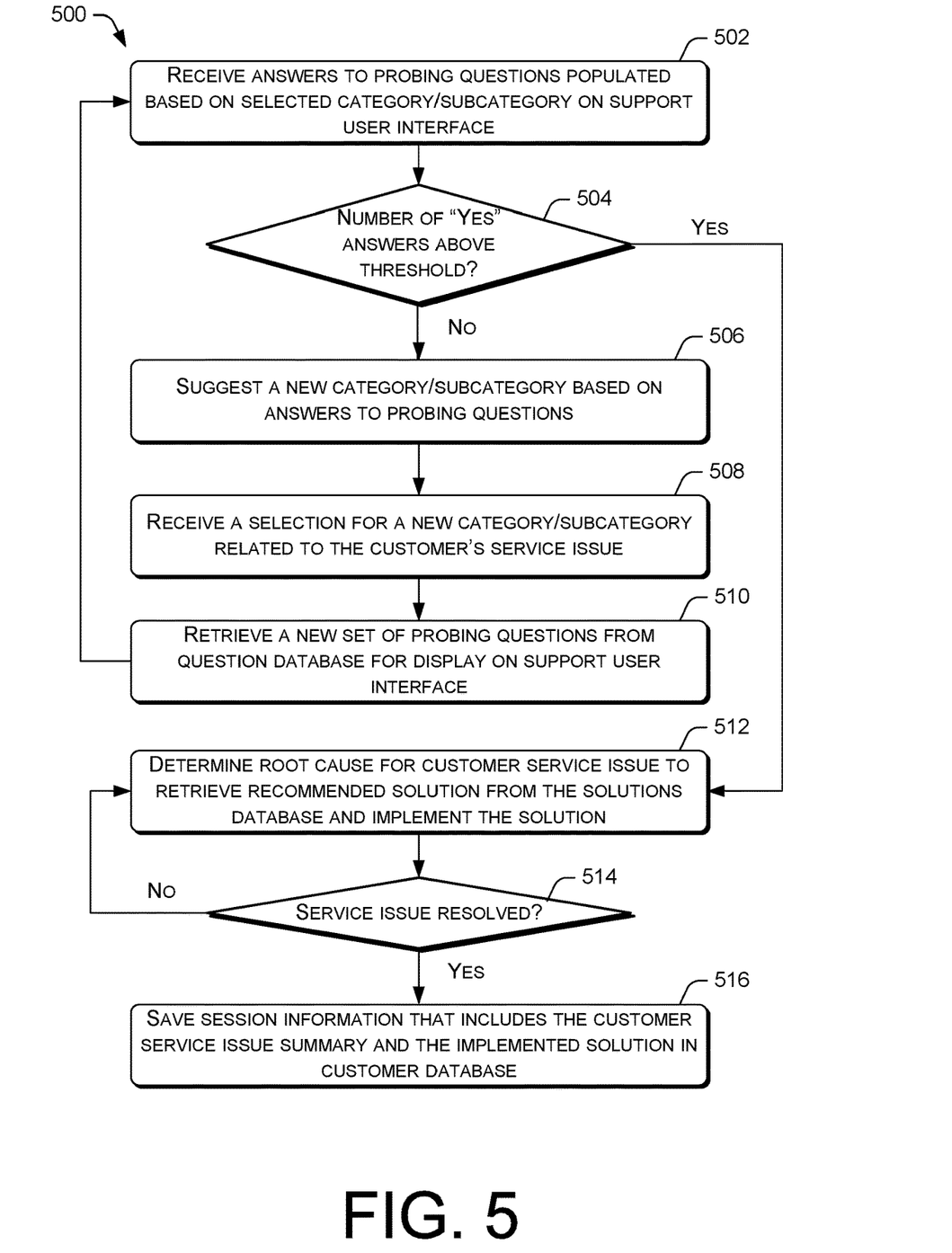
FIG. 5 is a flow diagram of an example process for correcting or re-selecting a category related to service issues to retrieve a new set of probing questions during a support session.

FIGS. 4-5 present illustrative processes 400-500 for using a troubleshooting and diagnostic tool to retrieve and display probing questions to a customer support representative via a support user interface. Each of the processes 400-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 400-500 are described with reference to the architecture 100 of FIG. 1.

FIG. 4 is a flow diagram of an example process 400 for retrieving and displaying probing questions via a support user interface. At block 402, the support communication engine establishes a communication connection between a customer of a wireless telecommunication network and a customer support representative using a customer chat application or a telephone call. In various embodiments, a customer may use a user device to place a telephone support call to a customer care phone number of the wireless telecommunication network. In turn, the support communication engine may prompt the customer to leave a message in the form of a brief audio recording that describes a service problem encountered by the customer. Alternatively, the customer may use a customer chat application on the user device to initiate a support chat session with the support communication engine. The support communication engine routes the customer to a customer support representative at a troubleshooting and ticketing terminal to begin a support session.

At block 404, the troubleshooting and diagnostics tool displays a list of categories related to a customer service issue on the support user interface of a support application at the troubleshooting and ticketing terminal. The categories are derived from the questions database that is managed by an administrator at the admin terminal via the question management application. The customer support representative can conduct an initial investigation via interactions with the customer to select one of the categories on the support user interface.

At block 406, a customer support representative selects a category related to the customer's service issue on the support user interface. It is noted that only one category can be selected at a time to facilitate identification of probable root cause and to determine potential solution implementation for the service issue. At decision block 408, the troubleshooting and diagnostics tool determines whether there are any subcategories associated with the selected category. If there are subcategories associated with the selected category, the support user interface populates a list of subcategories related to the selected category for display as indicated in block 410. The subcategories are also derived from the questions database that is managed by an administrator at the admin terminal via the question management application.

At block 412, the customer support representative selects a subcategory related to the customer's service issue. Only one subcategory is selected at a time based on the service issue as provided by the customer during the support session. Upon selection of a category or a subcategory, the remaining unselected categories or subcategories can be removed from being displayed on the user interface or become inactive. In some embodiments, the troubleshooting and diagnostics tool can automatically categorize a service issue via a machine-learning algorithm. In various embodiments, the machine learning classification algorithm may match specific words or phrases that the customer used in the service issue to identify the appropriate category. In some embodiments, the machine-learning classification algorithm may also use contextual information and/or external data from various data sources to determine the most appropriate category for the service issue.

At block 414, the troubleshooting and diagnostics tool retrieves from the question database a smart checklist that includes a set of probing questions related to the selected category or subcategory for display on the support user interface. The question database is regularly maintained so that it includes the most up-to-date checklists and probing questions. In a preferred embodiment, the probing questions comprise "yes" or "no" questions, wherein one or more probing questions can comprise follow up questions.

At block 416, the customer support representative selects answers to the probing questions based on the interactions with the customer in order to troubleshoot and diagnose the customer's service issue. More specifically, the customer support representative can click on a "yes" or "no" button under each probing question. In some embodiments, subsequent questions can appear after selection of an answer to a preceding question. In some embodiments, all of the probing questions in the smart checklist can appear concurrently on the user interface.

At block 418, the filter and selection module filters subsequent probing questions based on previously answered probing questions. For example, if the customer provides a "yes" answer to a probing question, the filter and selection module presents one or more follow-up questions for display on the user interface. On the other hand, if the customer provides a "no" answer to the probing question, the filter and selection module can skip the follow-up questions. In some embodiments, the filter and selection module utilizes machine-learning algorithms to automatically filter subsequent questions.

At decision block 420, the support evaluation module determines whether the customer support representative selected a correct category or whether the service issue was correctly categorized before proceeding to troubleshoot and determining a probable root cause to implement a potential solution. If a correct category was selected ("yes" at decision block 420), the recommendation module determines a root cause to the service issue and obtains potential solutions from the solutions database based on the answers to probing questions as indicated in block 422. The determined root cause can be displayed on the user interface. Alternatively, if an incorrect category was selected ("no" at decision block 420), the customer's service issue can be re-categorized. An example process for re-categorizing a customer's service issue is depicted in FIG. 5. At block 502, the customer support representative answers probing questions populated based on the originally selected category or subcategory on the support user interface.

At decision block 504, the support evaluation module determines whether the customer's answers to the probing questions correspond to expected answers. For example, the support evaluation module can determine that the service issue is correctly categorized when the number of "yes" answers exceeds a predetermined threshold (e.g., more than 80% of the questions comprise "yes" answers). In some embodiments, an administrator at the admin terminal sets the predetermined threshold. If there are not enough "yes" answers, or the number of "yes" answers falls below the predetermined threshold, the support evaluation module triggers the recommendation module to suggest a new category or subcategory for selection based on the answers to the initial set of probing questions, as indicated in block 506. Alternatively, the support evaluation module determines whether the customer's answers to certain probing questions correspond to expected answers. For example, the support evaluation module can determine that the service issue is correctly categorized when certain probing questions comprise "yes" answers and certain probing questions comprise "no" answers. If the customer's answers do not correspond with expected answers, the support evaluation module triggers the recommendation module to suggest a new category or subcategory for selection based on the answers to the initial set of probing questions.

At block 508, the customer support representative can select a new category or subcategory related to the customer's service issue. In this regard, the buttons or icons for categories and/or subcategories can become active. In some embodiments, the user interface requires the customer support representative to select a new category before proceeding to troubleshoot. In this way, the troubleshooting and diagnostics tool prevents the determination of the incorrect root cause and subsequently implementing the wrong potential solution. In other embodiments, however, the customer support representative can bypass the suggestion and select another category on his or her own based on his or her knowledge and interactions with the customer or proceed to troubleshoot.

Once a new category or subcategory is selected, the troubleshooting and diagnostics tool retrieves a new set of probing questions from the question database for display on the support user interface, as indicated in block 510. Thereafter, the customer support representative answers the new set of probing question and the support evaluation module 212 determines whether the service issue was correctly categorized using the methodology as described above. If the service issue was not correctly categorized, the recommendation module can suggest another category and the process repeats until the service issue is correctly categorized.

If the service issue is correctly categorized (e.g., there are enough "yes" answers or the customer answers correspond with expected answers), the recommendation module determines a root cause for the customer's service issue to retrieve recommended solution from the solutions database and implement the solution, as indicated in block 512. In some embodiments, the recommendation module may generate a potential solution for the service issue based on the customer's answers using a machine learning-based recommendation algorithm. In various embodiments, the machine learning algorithms may include a naïve Bayes algorithm, a Bayesian network algorithm, a decision tree algorithm, a neural network algorithm, and/or so forth. In operation, the recommendation module may use a machine-learning algorithm to determine a root cause for a service issue. Subsequently, the recommendation module may find one or more matching potential solutions for the root cause from a solutions database.

At decision block 514, the troubleshooting and diagnostics tool determines if the service issue was resolved. In some embodiments, the troubleshooting and diagnostics tool determines that the service issue is resolved if an expected performance improvement is achieved. If the service issue was not resolved, the recommendation module determines another root cause to retrieve another potential solution. The solution is implemented until the service issue is resolved. If the troubleshooting and diagnostics tool determines that the service issue is resolved ("yes" at decision block 514), the process 500 may proceed to block 516.

At block 516, the troubleshooting and diagnostics tool can save the session information in form of a session memo that includes the customer service issue summary and the implemented solution based on the obtained knowledge and/or experience of the customer support representative in the customer database. As described herein, the session memo can recite factual data about a service problem, such as date and time the service problem first occurred, the location of the affected user device when the service problem occurred, the duration of the service problem, the symptoms experienced by the customer with respect to the service problem, attempted solutions for the service problem, and/or so forth. The session memo may further include communications that are exchanged between customers and the initial customer support representative.

The use of the troubleshooting and diagnostics tool may increase the likelihood that a customer who is experiencing a service issue achieves a one-call resolution. Further, the process of categorizing service issues to retrieve a smart checklist of relevant probing questions to determine root cause of a service issue enables customer support representatives to implement potential solutions that are more likely to be successful. Thus, the techniques may increase customer satisfaction and customer retention by providing effective solutions to customer's service issues while improving customer support performance.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-implemented method, comprising: displaying categories related to a service issue on a support user interface of a troubleshoot and diagnostics tool of a support application, the service issue being received from a customer's user device connected to a wireless telecommunication network via an online chat session or a telephone call during a customer support session;
  receiving, via the support user interface, a selection associated with one of the categories related to the service issue;
  retrieving, from a problem database, a unique predetermined set of probing questions having individual probing questions generated based at least on the selection, wherein the individual probing questions are associated with weight based at least on relevancy to the selected category and the service issue;
  displaying at least one of the individual probing questions in order based at least on the weight on the support user interface;
  receiving, via the support user interface, an answer for the at least one of the individual probing questions of the unique predetermined set of probing questions;
  generating a potential solution for the service issue based at least on the answer to the individual probing questions of the unique predetermined set of probing questions;
  generating a session memo for the customer support session, the session memo including the selected category, the unique predetermined set of probing questions, and the answer for the individual probing questions of the unique predetermined set of probing questions;
  determining whether the service issue is correctly categorized based at least on the answer to the individual probing questions of the unique predetermined set of probing questions;
  in response to determining the service issue is not correctly categorized, displaying a notification on the support user interface to select a new category;
  identifying a new category for a recommendation based at least on the answer to the individual probing questions of the unique predetermined set of probing questions;
  displaying the new category for selection on the support user interface;
  receiving, via the support user interface, a selection associated with the new category;
  generating, from the problem database, a new set of probing questions based at least on the selection of the new category, the new set of probing questions having additional individual probing questions, wherein at least one of the individual probing questions and at least one of the additional individual probing questions overlap; and displaying at least one of the additional individual probing questions of the new set of probing questions on the support user interface.

2. The computer-implemented method of claim 1, further comprising the steps of:

implementing the potential solution based at least on the answer to the individual probing questions of the unique predetermined set of probing questions.

3. The computer-implemented method of claim 2, further comprising the steps of:

determining whether an expected performance improvement is achieved after implementing the potential solution; and if the expected performance improvement is not achieved, recommending a new potential solution.

4. The computer-implemented method of claim 1, further comprising the steps of:

upon receiving the selection associated with one of the categories related to the service issue, displaying subcategories related to the service issue on the support user interface; and receiving, via the support user interface, a selection associated with one of the subcategories related to the service issue.

5. The computer-implemented method of claim 4, further comprising the steps of: displaying another set of probing questions on the support user interface based at least on the selected subcategory.

6. One or more non-transitory computer-readable media storing computer-executable instructions that upon execution cause one or more processors to perform acts comprising:

displaying categories related to a service issue on a support user interface of a support application, the service issue being received from a customer's user device connected to a wireless telecommunication network via an online chat session or a telephone call during a customer support session;

receiving, via the support user interface, a selection associated with one of the categories related to the service issue;

retrieving, from a problem database, a unique predetermined set of probing questions having individual probing questions generated based at least on the selection, wherein the individual probing questions are associated with weight based at least on relevancy to the selected category and the service issue;

displaying at least one of the individual probing questions in order based at least on the weight on the support user interface;

receiving, via the support user interface, an answer for the at least one of the individual probing questions of the unique predetermined set of probing questions;

generating a potential solution for the service issue based at least on the answer to the individual probing questions of the unique predetermined set of probing questions;

generating a session memo for the customer support session, the session memo including the selected category, the unique predetermined set of probing questions, and the answer for the individual probing questions of the unique predetermined set of probing questions;

determining whether the service issue is correctly categorized based at least on the answer to the individual probing questions of the unique predetermined set of probing questions;

if the service issue is not correctly categorized, displaying a notification on the support user interface to select a new category;

identifying a new category for a recommendation based at least on the answer to the individual probing questions of the unique predetermined set of probing questions;

displaying the new category for selection on the support user interface;

receiving, via the support user interface, a selection associated with the new category;

generating, from the problem database, a new set of probing questions based at least on the selection of the new category, the new set of probing questions having additional individual probing questions, wherein at least one of the individual probing questions and at least one of the additional individual probing questions overlap; and displaying at least one of the additional individual probing questions of the new set of probing questions on the support user interface.

7. The one or more non-transitory computer-readable media of claim 6, wherein the acts further comprise:

implementing the potential solution based at least on the answer to the individual probing questions of the unique predetermined set of probing questions.

8. The one or more non-transitory computer-readable media of claim 7, wherein the acts further comprise:

determining whether an expected performance improvement is achieved after implementing the potential solution; and if the expected performance improvement is not achieved, recommending a new potential solution.

9. The one or more non-transitory computer-readable media of claim 6, wherein the acts further comprise:

upon receiving the selection associated with one of the categories related to the service issue, displaying subcategories related to the service issue on the support user interface; and receiving, via the support user interface, a selection associated with one of the subcategories related to the service issue.

10. The one or more non-transitory computer-readable media of claim 9, wherein the acts further comprise: displaying a new another set of probing questions on the support user interface based at least on the selected subcategory.

11. A system, comprising:

one or more processors; and a memory including a plurality of computer-executable components that are executable by the one or more processors to perform a plurality of actions, the plurality of actions comprising:

displaying categories related to a service issue on a support user interface of a troubleshoot and diagnostics tool of a support application, the service issue being received from a customer's user device connected to a wireless telecommunication network via an online chat session or a telephone call during a customer support session;

receiving, via the support user interface, a selection associated with one of the categories related to the service issue;

retrieving, from a problem database, a unique predetermined set of probing questions having individual probing questions generated based at least on the selection, wherein the individual probing questions are associated with weight based at least on relevancy to the selected category and the service issue;

displaying at least one of the individual probing questions in order based at least on the weight on the support user interface;

receiving, via the support user interface, an answer for the at least one of the individual probing questions of the unique predetermined set of probing questions;

generating a potential solution for the service issue based at least on the answer to the individual probing questions of the unique predetermined set of probing questions;

generating a session memo for the customer support session, the session memo including the selected category, the unique predetermined set of probing questions, and the answer for the individual probing questions of the unique predetermined set of probing questions;

determining whether the service issue is correctly categorized based at least on the answer to the individual probing questions of the unique predetermined set of probing questions;

if the service issue is not correctly categorized, displaying a notification on the support user interface to select a new category;

identifying a new category for a recommendation based at least on the answer to the individual probing questions of the unique predetermined set of probing questions;

displaying the new category for selection on the support user interface;

receiving, via the support user interface, a selection associated with the new category;

generating, from the problem database, a new set of probing questions based at least on the selection of the new category, the new set of probing questions having additional individual probing questions, wherein at least one of the individual probing questions and at least one of the additional individual probing questions overlap; and displaying at least one of the additional individual probing questions of the new set of probing questions on the support user interface.

12. The system of claim 11, further comprising:

implementing the potential solution based at least on the answer to the individual probing questions of the unique predetermined set of probing questions;

determining whether an expected performance improvement is achieved after implementing the potential solution; and if the expected performance improvement is not achieved, recommending a new potential solution.

13. The system of claim 11, further comprising: upon receiving the selection associated with one of the categories related to the service issue, displaying subcategories related to the service issue on the support user interface; and receiving, via the support user interface, a selection associated with one of the subcategories related to the service issue; and displaying another set of probing questions on the support user interface based at least on the selected subcategory.

* * * * *